US006250425B1

(12) United States Patent
Barnes et al.

(10) Patent No.: US 6,250,425 B1
(45) Date of Patent: Jun. 26, 2001

(54) LADDER SUPPORT RACK

(76) Inventors: Walter P. Barnes, 830 Wimbish Rd.; Carlo Emilio, 1120 Castlegate Dr., both of Macon, GA (US) 31210

( * ) Notice: Subject to any disclaimer, the term of this patent is extended or adjusted under 35 U.S.C. 154(b) by 0 days.

(21) Appl. No.: 09/442,537

(22) Filed: Nov. 18, 1999

(51) Int. Cl.7 ................................ E06C 5/00; B60P 9/00

(52) U.S. Cl. .......................... 182/127; 414/462; 224/310

(58) Field of Search .................................... 182/127, 129, 182/93; 224/310, 42.42, 42.1 F, 42.43, 42.38; 248/503, 226, 201; 211/182, 13, 195; 280/4, 32.5, 481; 414/462

(56) References Cited

U.S. PATENT DOCUMENTS

| | | | | |
|---|---|---|---|---|
| 2,035,537 | | 3/1936 | Cowan et al. | 228/6 |
| 2,586,531 | | 2/1952 | Gordon | 228/6 |
| 2,914,134 | | 11/1959 | Weidner | 182/127 |
| 3,750,845 | * | 8/1973 | Faulstich | 182/127 |
| 4,008,838 | * | 2/1977 | Correll | 182/127 X |
| 4,113,055 | | 9/1978 | Gleockler et al. | 182/63 |
| 4,180,282 | | 12/1979 | Henning | 280/481 |
| 4,228,870 | | 10/1980 | Beardsley | 182/127 |
| 4,408,680 | | 10/1983 | Ross | 182/68 |
| 4,614,252 | | 9/1986 | Tarner | 182/116 |
| 4,751,981 | * | 6/1988 | Mitchell et al. | 182/127 |
| 4,909,352 | | 3/1990 | McComb | 182/127 |
| 4,923,103 | * | 5/1990 | Sauber | 224/42.45 R |
| 5,236,062 | | 8/1993 | Laney | 182/127 |
| 5,297,912 | * | 3/1994 | Levi | 414/462 |
| 5,330,312 | * | 7/1994 | Allsop et al. | 224/42.03 X |
| 5,350,095 | * | 9/1994 | Stevens | 224/310 X |
| 5,398,778 | * | 3/1995 | Sexton | 182/127 |
| 5,651,484 | * | 7/1997 | Fugman | 224/310 X |
| 5,662,254 | * | 9/1997 | Lemajeur et al. | 224/405 |
| 5,850,891 | * | 12/1998 | Olms et al. | 182/127 |
| 6,092,972 | * | 7/2000 | Levi | 224/310 X |
| 6,099,231 | * | 8/2000 | Levi | 224/310 X |

* cited by examiner

*Primary Examiner*—Daniel P. Stodola
*Assistant Examiner*—Hugh B. Thompson
(74) *Attorney, Agent, or Firm*—Marshall, O'Toole, Gerstein, Murray & Borun

(57) ABSTRACT

A ladder support rack which can be removably attached to a wheeled vehicle such as a tractor capable of supporting a non-attached ladder. A receiver portion removably mounts to one tractor end. A frame assembly removably mounts to the receiver and includes a top frame and a bottom frame. A ladder is inserted into the frame assembly and held in place by a support hook at the top frame and by support feet at the bottom frame. The ladder is not physically mounted to the frame assembly so the tractor and ladder can be used for other purposes.

3 Claims, 4 Drawing Sheets

LADDER SUPPORT RACK

This invention relates to ladders and more specifically to ladders supported on vehicles for moving the ladders during use.

BACKGROUND OF THE INVENTION

Ladders are often required when attempting to reach the tops of trees or lower locations to, for example, pick its fruit, or to conduct maintenance such as spraying and pruning, particularly walnuts etc. When there are numerous trees as in an orchard, it often becomes cumbersome to continually have to move the ladder from tree to tree to enable the worker to pick its fruit. It would therefore be desirable to provide an apparatus which allows for quick and easy movement of a ladder from tree to tree.

There have been proposed various structures attached to vehicles to support a ladder. Reference may be made to U.S. Pat. Nos. 5,236,062, 4,113,055, 4,614,252 and 4,909,352. These references show, for instance, ladders attached to the rear of vehicles as well as ladders placed in the bed of a truck. These references further disclose a ladder support structure where the ladder is physically attached to the structure itself and is moved from location to location by the vehicle. Such proposed structures require a specific vehicle and ladder, and a separate ladder for other uses, thereby increasing costs for the orchard owner.

It is desired to provide a versatile ladder and vehicle configuration which will permit the vehicle and ladder to be used together or separately.

SUMMARY OF THE INVENTION

Accordingly, the present invention provides a ladder support rack, which can be attached to the front end of a wheeled vehicle which is capable of supporting a ladder that is not physically affixed to the structure itself.

In particular, the current invention provides a ladder support rack structure, which is attached to the front end of a vehicle, such as a tractor, which is capable of supporting a standard ladder that is not physically mounted to the support structure itself and can readily be removed therefrom. This creates the advantage of enabling the user to use any size or type of ladder as dictated by the type of job being done. Another advantage of the current invention is that the support structure is easily disassembled for storage and to enable one to use the motor vehicle for other tasks that does not include the need for a ladder.

Other advantages of the invention may become apparent to those skilled in the art from the following detailed description, taken in conjunction with the figures and the appended claims.

DETAILED DESCRIPTION OF THE INVENTION

Figure 1:
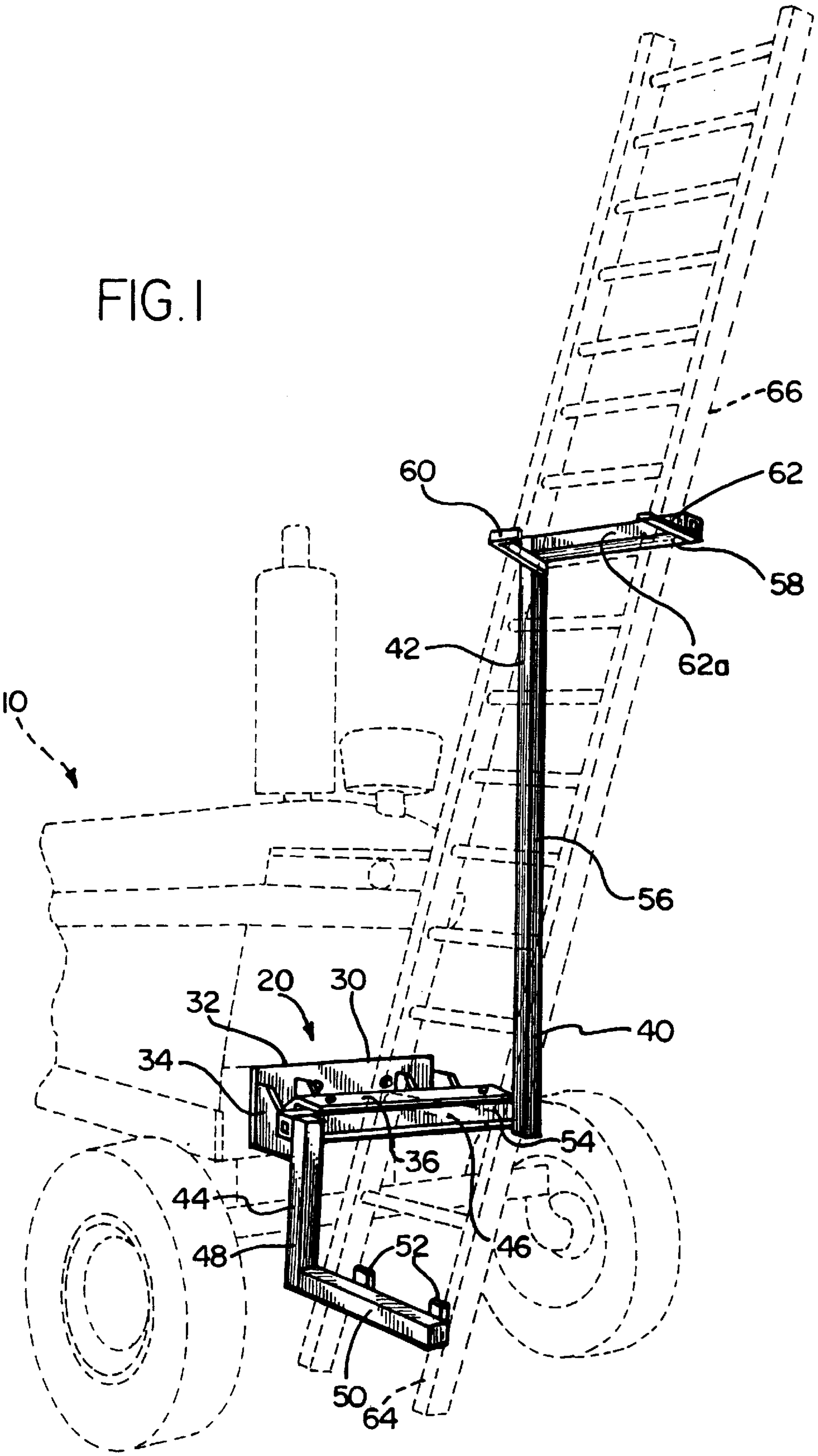
FIG. 1 is a perspective view showing an embodiment of the ladder placed in a ladder support rack according to the invention which is secured and supported by a tractor.

As can be seen in FIG. 1, a ladder support rack 20 is removably mounted to the front end of a wheeled vehicle 10 for supporting a ladder 66 which is supported but not physically mounted to the ladder support rack 20. The ladder support rack 20 includes a receiver 30 and a frame assembly 40. The frame assembly 40 can be constructed of either one piece or two pieces.

The receiver 30 has a flat rectangular face 32 with a rear surface which rests flush against one end of the wheeled vehicle 10. On an opposite front surface of the flat rectangular face 32 there are provided a plurality of triangular-shaped support arms 34 which support a receiving rail 36 extending over the triangular-shaped support arms 34. The flat rectangular face 32 is attached to one end of the wheeled vehicle 10 by suitable means known in the art such as bolts or clamps. For instance, the flat rectangular face 32 may have bolt-receiving bores 38 through which bolts 41 pass to attach the receiver 30 to the wheeled vehicle 10. The receiving rail 36 is equipped with suitable means to attach the frame assembly 40 to the receiver 30. For example, the receiver 30 may have bores 39 through which bolts 35 are placed to securely mount the receiver 30 to the frame assembly 40.

Figure 5:
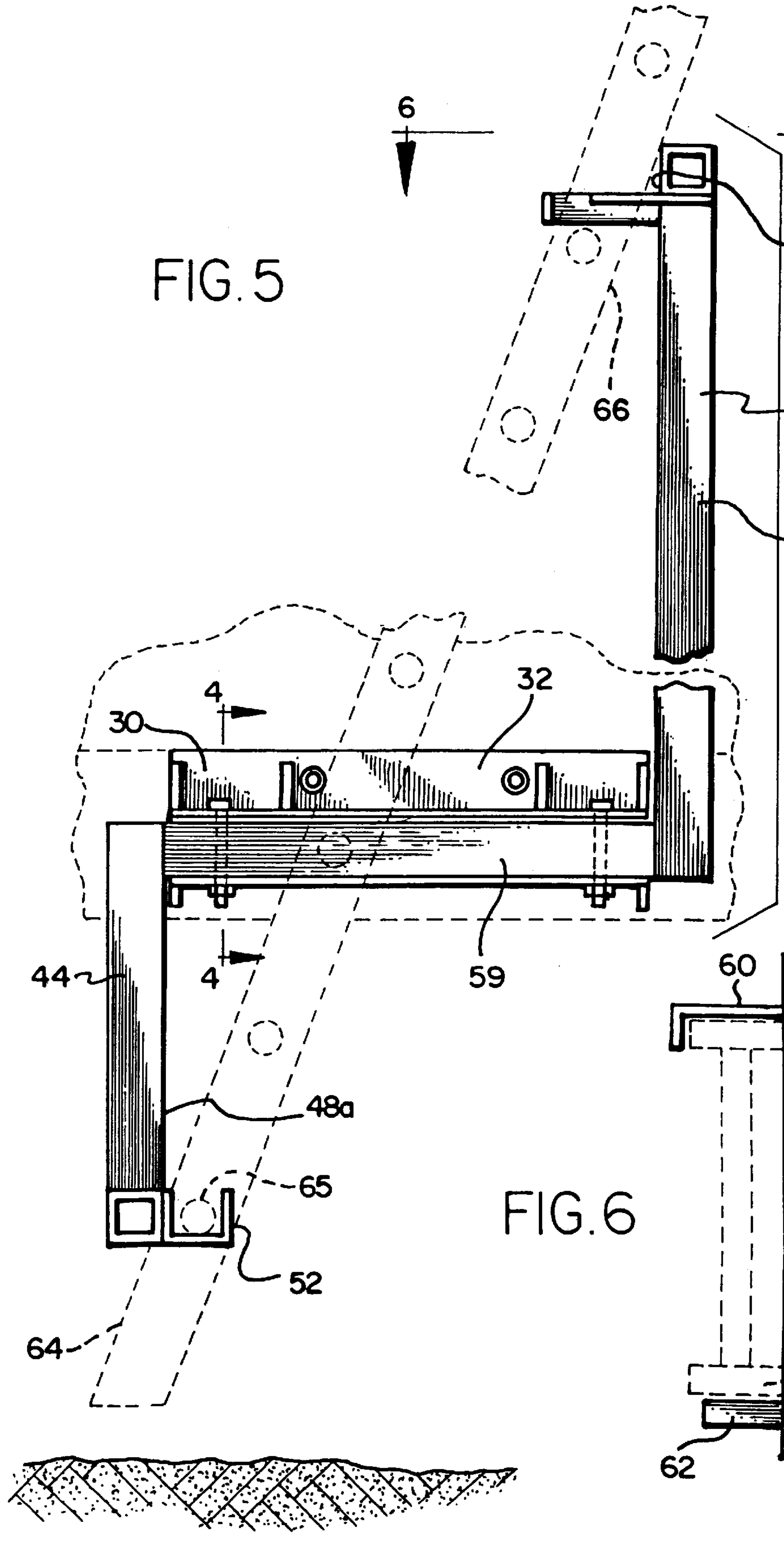
FIG. 5 is a fragmented side elevational view of the ladder support rack showing the ladder used in connection therewith.
Figure 7:
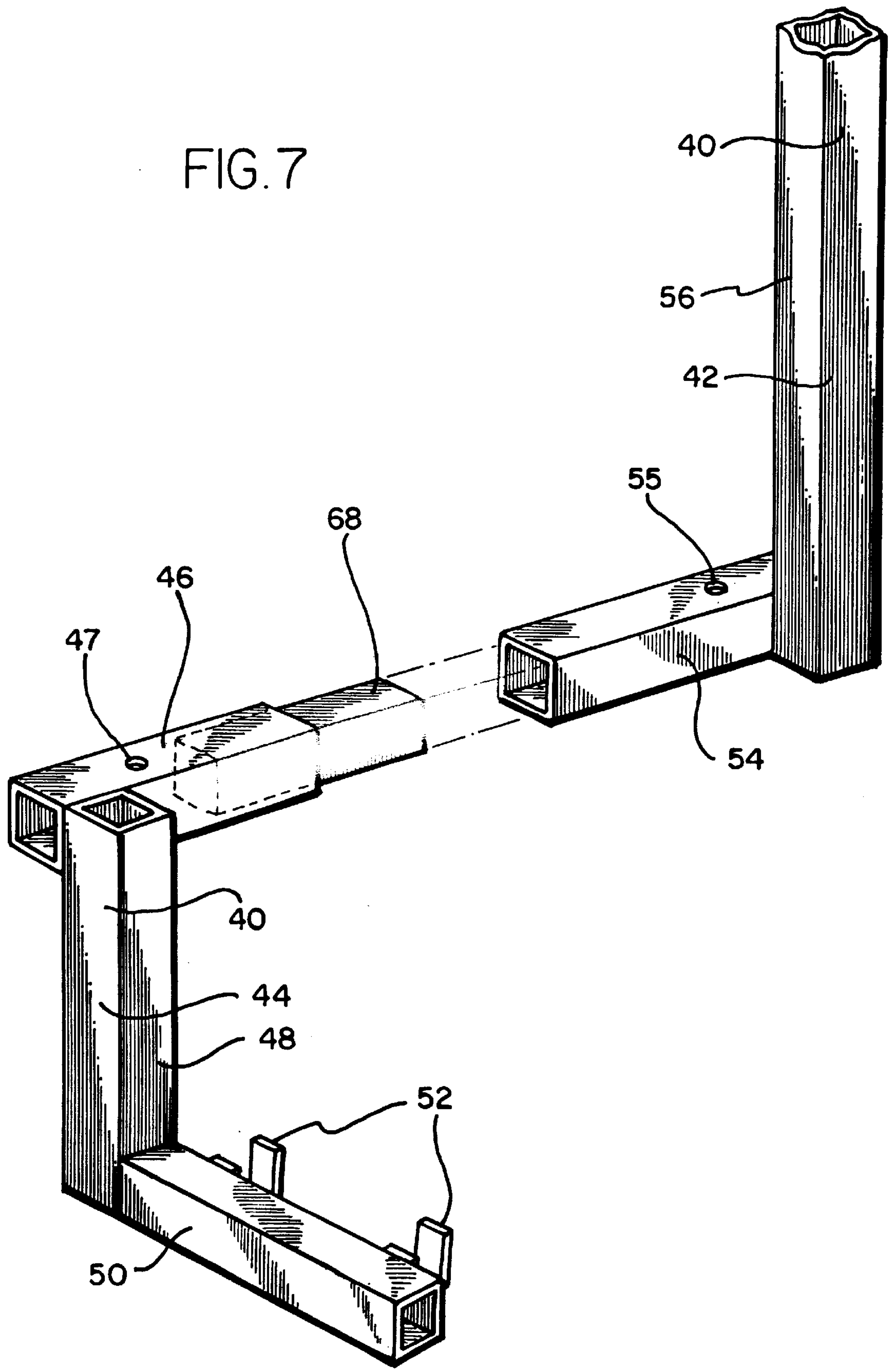
FIG. 7 is an enlarged fragmented perspective view of the frame assembly.

The frame assembly 40 may be constructed of one piece or two pieces. In the preferred mode according to the invention the frame assembly 40 consists of two pieces, namely a top frame 42 and a bottom frame 44. (See FIG. 7) The bottom frame 44 consists of a horizontal bottom support rod 46, a vertical bottom support rod 48, and a horizontal bottom ladder support 50. The horizontal bottom support rod 46 may further have bores 47 useful for securing the frame assembly 40 to the receiver 30. On the horizontal bottom ladder support 50 are two ladder support feet 52. As shown in FIGS. 1 and 5, a rung of the ladder 66 is placed on these two ladder support feet 52 so that the front edge 64 of the ladder 66 rests against the back side of the vertical bottom support rod 48*a* while the rung 65 of the ladder rests snugly in the ladder support feet 52.

Figure 6:
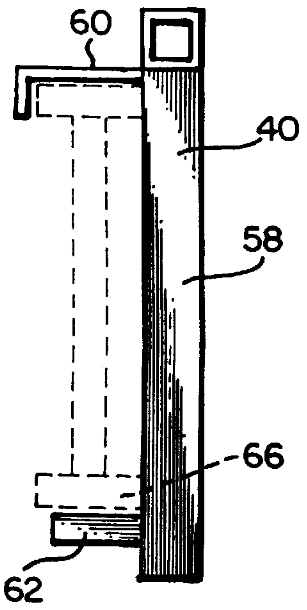
FIG. 6 is a top view taken along lines 5—5 of FIG. 5 showing the ladder retained within the top of the frame assembly.

The top frame 42 consists of a horizontal top support rod 54, a vertical top support rod 56, and a horizontal top ladder support 58. The horizontal top support rod 54 may further have bores 55 useful for securing the frame assembly 40 to the receiver 30. As shown in FIGS. 1 and 6, the horizontal top ladder support 58 further has a ladder support bar 62 and a ladder support hook 60 extending therefrom. As shown in FIGS. 1 and 6, the back edge of the ladder 66 rests at an incline against the front side of the ladder support bar 62*a*. As shown in FIG. 6, the ladder support hook 60 hugs the side and front edge of one side of the ladder, while the other side edge of the other side of the ladder rests against the ladder support bar 62.

The horizontal top support rod 54 is hollow and has a larger perimeter than the horizontal bottom support rod 46 to allow the horizontal top support rod 54 to telescope over the horizontal bottom support rod 46. In an alternative embodiment to add further support if the horizontal bottom support rod 46 is hollow as well, a solid rectangular rod 68 is partially inserted into the horizontal bottom support rod 46 which in turn is then inserted into the horizontal top support rod 54. The solid rectangular rod 68 may be secured to the horizontal bottom support rod 46 by any means known in the art including fusing the solid rectangular rod 68 to the bottom support rod 46 or by other securement means such as bolts or clamps.

Similarly, the horizontal bottom support rod 46 may be secured to the horizontal top support rod 54 by any means known in the art such as bolts or clamps. In the preferred embodiment, the horizontal bottom support rod 46 is detachably secured so that one may easily separate the top frame 42 from the bottom frame 44 after use. In an alternate embodiment, the horizontal bottom support rod 46 and the horizontal top support rod 54 may be fused together thus making the top frame 42 and the bottom frame 44 one piece.

Figure 2:
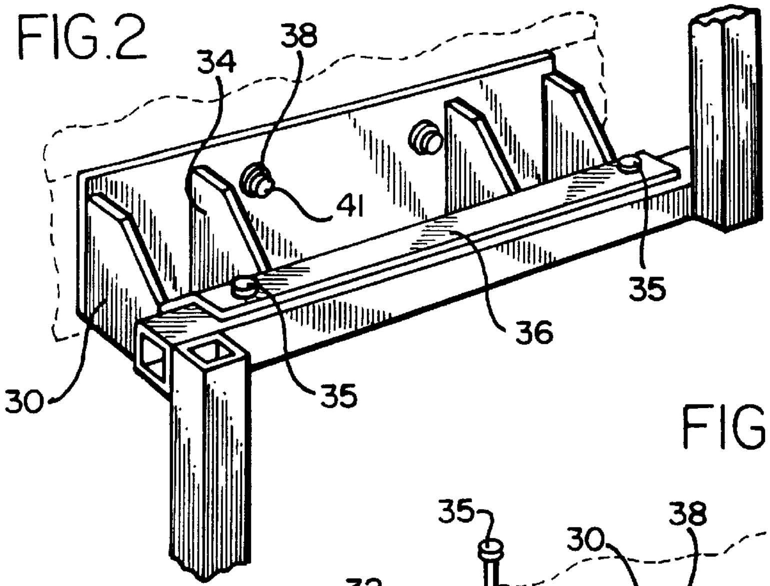
FIG. 2 is an enlarged perspective view of a receiver portion of the ladder support rack of FIG. 1, which shows the attachment between the receiver and a frame assembly.
Figure 3:
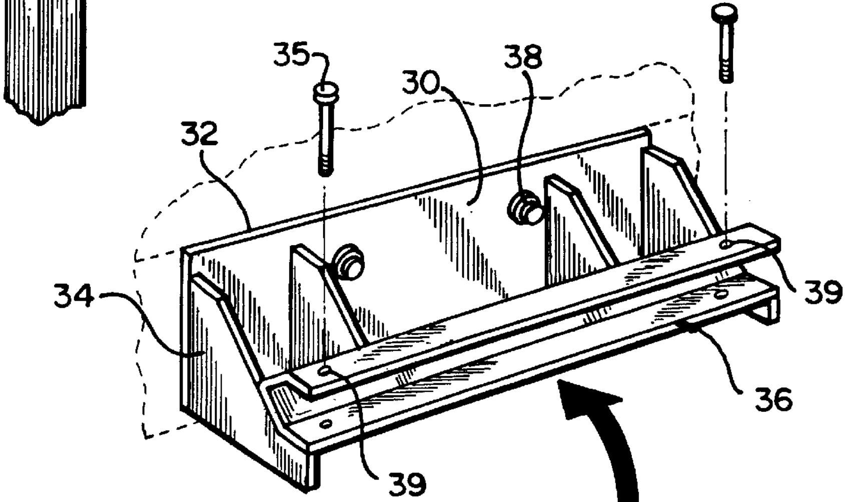
FIG. 3 is an enlarged perspective view of the receiver of FIG. 2 with the frame assembly shown detached.
Figure 3:
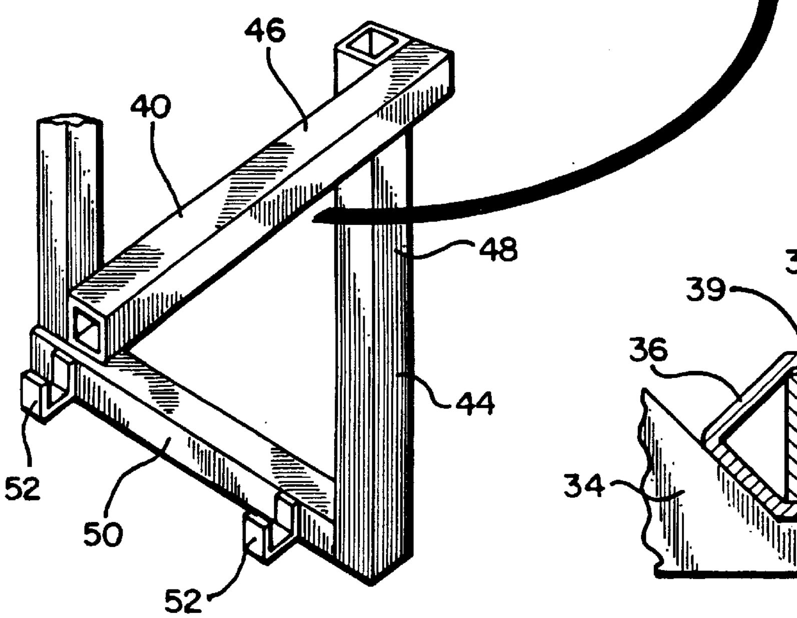
Figure 4:
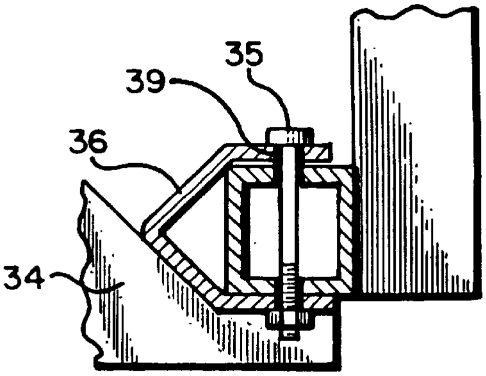
FIG. 4 is a cross-section view of the receiver and the frame assembly taken along section lines 4—4 of FIG. 5.

Once the top frame 42 and the bottom frame 44 are attached, they must then be attached to the receiver 30. As shown in FIGS. 2 and 3, the receiving rail 36 may have bores as 39 through which bolts 35 may pass through and in turn pass through the bores 47, 55 in the horizontal bottom support rod 46 and the horizontal top support rod 54 thereby securing the frame assembly 40 to the receiver 30.

Although the figures show that the different members of the frame assembly 40 are rectangular, the members of the frame assembly 40 may be other shapes as well, including but not limited to circular, or triangular.

The ladder support rack 20 may be made of any material known in the art that is capable of supporting the weight of a ladder and its user(s). The ladder support rack 20 may be made of any material, including but not limited to metal or plastic.

In an orchard operation, for instance, the ladder support rack 20 of the present invention is readily mounted to a tractor 10 and the tractor is driven to the work location. The ladder 66 is then inserted into the ladder support rack as described above and maintained in position for use as shown in FIGS. 1, 5, and 6. When the orchard work is completed, the ladder is readily lifted away from the ladder support rack. The tractor may be moved to a new orchard location where the ladder is needed, or if the orchard work is completed, then the ladder support rack is readily dismounted from the tractor. Accordingly, the tractor and the ladder can be utilized for other uses, and the ladder support rack of the present invention enables this flexibility in usage and economy.

The foregoing detailed description is given for clearness of understanding only, and no unnecessary limitations should be understood therefrom, as modifications within the scope of the invention may become apparent to those skilled in the art.

What is claimed is:

1. A ladder support rack assembly including a ladder and a ladder support rack which supports said ladder in a use position, said ladder support rack adapted to be removably attached to a wheeled vehicle, wherein the ladder support rack comprises:

a receiver including a flat face for removable attachment to the wheeled vehicle, and a plurality of support arms projecting from the receiver opposite the flat face for holding a receiving rail; and a frame assembly supporting said ladder in said use position, said frame assembly including an integral unit comprising a top frame and a bottom frame, said top frame comprising a vertical top support rod, a horizontal top support rod extending from one end of the vertical top support rod, and a horizontal top ladder support extending from the other end of the vertical support rod, and said bottom frame comprising a vertical bottom support rod, a horizontal bottom support rod extending from one end of the vertical bottom support rod, and a horizontal bottom ladder support extending from the other end of the vertical bottom support rod, wherein said horizontal top ladder support includes a ladder support bar and a ladder support hook spaced from said support bar, each extending from said horizontal top ladder support and engaging said ladder in said use position, and wherein said horizontal bottom ladder support includes two ladder support feet at opposite ends thereof which engage said ladder in said use position.

2. The ladder support rack of claim 1 wherein the integral unit top frame and bottom frame are fused together.

3. A ladder support rack removably attached to a wheeled vehicle wherein the rack comprises:

a receiver including a receiving rail, a frame assembly capable of supporting a non-attached ladder, said frame assembly removably mountable to the receiving rail, the receiver includes a flat face removably attached to the wheeled vehicle, and a plurality of support arms projecting from the receiver opposite the flat face, the plurality of support arms capable of holding the receiving rail, the frame assembly comprises a top frame and a bottom frame, said top frame includes a vertical top support rod, a horizontal top rod at one end of the top support rod, and a horizontal top ladder support at the other end of the top support rod, and wherein said bottom frame includes a vertical bottom support rod, a horizontal bottom support rod at one end of the bottom support rod, and a horizontal bottom ladder support at other end of the bottom support rod, the horizontal top ladder support includes a ladder support bar and a ladder support hook extending therefrom, and the horizontal bottom ladder support includes two ladder support feet at opposite ends of the bottom ladder support, and the horizontal top support rod is hollow and has a larger perimeter than the horizontal bottom support rod to enable the horizontal top support rod to telescope over the horizontal bottom support rod.

* * * * *